(12) United States Patent
Cheung (10) Patent No.: US 8,229,751 B2
(45) Date of Patent: Jul. 24, 2012

(54) METHOD AND APPARATUS FOR AUTOMATIC DETECTION AND IDENTIFICATION OF UNIDENTIFIED BROADCAST AUDIO OR VIDEO SIGNALS

(75) Inventor: Kwan Cheung, Bryn Mawr, PA (US)

(73) Assignee: Mediaguide, Inc., King of Prussia, PA (US)

( * ) Notice: Subject to any disclaimer, the term of this patent is extended or adjusted under 35 U.S.C. 154(b) by 1121 days.

(21) Appl. No.: 11/322,706

(22) Filed: Dec. 30, 2005

(65) Prior Publication Data
US 2007/0109449 A1 May 17, 2007

Related U.S. Application Data

(63) Continuation-in-part of application No. PCT/US2005/004802, filed on Feb. 16, 2005.

(60) Provisional application No. 60/547,931, filed on Feb. 26, 2004, provisional application No. 60/736,348, filed on Nov. 14, 2005.

(51) Int. Cl.
*G10L 11/00* (2006.01)
(52) U.S. Cl. ......................... 704/270; 704/276
(58) Field of Classification Search .................. 704/270, 704/276
See application file for complete search history.

(56) References Cited

U.S. PATENT DOCUMENTS

| 5,151,788 A * | 9/1992 | Blum ............................. 348/725 |
|---|---|---|
| 5,436,653 A | 7/1995 | Ellis et al. |
| 5,612,729 A | 3/1997 | Ellis et al. |
| 5,651,094 A * | 7/1997 | Takagi et al. .................. 704/244 |
| 5,918,223 A | 6/1999 | Blum et al. |
| 6,584,223 B1 * | 6/2003 | Shiiyama ....................... 382/173 |
| 6,675,174 B1 * | 1/2004 | Bolle et al. ............................ 1/1 |
| 6,766,523 B2 * | 7/2004 | Herley ............................. 725/19 |
| 7,565,104 B1 * | 7/2009 | Brown et al. ................. 455/3.01 |
| 2002/0002541 A1 | 1/2002 | Williams |
| 2002/0099555 A1 * | 7/2002 | Pitman et al. .................. 704/500 |
| 2003/0033347 A1 * | 2/2003 | Bolle et al. ..................... 709/107 |
| 2003/0086341 A1 | 5/2003 | Wells et al. |
| 2003/0154084 A1 * | 8/2003 | Li et al. .......................... 704/273 |
| 2004/0091111 A1 * | 5/2004 | Levy et al. ..................... 380/202 |
| 2004/0162728 A1 * | 8/2004 | Thomson et al. ............. 704/255 |
| 2004/0193642 A1 | 9/2004 | Allen et al. |
| 2005/0125223 A1 * | 6/2005 | Divakaran et al. ............ 704/223 |
| 2005/0197724 A1 * | 9/2005 | Neogi ................................ 700/94 |
| 2006/0080356 A1 * | 4/2006 | Burges et al. ............. 707/103 R |
| 2006/0149552 A1 * | 7/2006 | Bogdanov ..................... 704/273 |
| 2006/0190450 A1 * | 8/2006 | Holm et al. ....................... 707/6 |
| 2006/0229878 A1 * | 10/2006 | Scheirer ........................ 704/273 |
| 2007/0055500 A1 * | 3/2007 | Bilobrov ........................ 704/217 |
| 2007/0058949 A1 * | 3/2007 | Hamzy et al. ................. 386/112 |
| 2008/0193016 A1 * | 8/2008 | Lim et al. ....................... 382/190 |

FOREIGN PATENT DOCUMENTS

WO WO-2005/081829 A2 9/2005

* cited by examiner

*Primary Examiner* — Douglas Godbold
(74) *Attorney, Agent, or Firm* — Ted Sabety; Sabety + associates PLLC (57) ABSTRACT

A system and method of detecting unidentified broadcast electronic media content using a self-similarity technique is presented. The process and system catalogues repeated instances of content that has not be positively identified, but are sufficiently similar as to infer repetitive broadcasts. These catalogued instances may be further processed on the basis of different broadcast channels, sources, geographic locations of broadcasts or format to further assist the identification thereof.

50 Claims, 3 Drawing Sheets

An Illustration of a repetition of the same program along time-axis.

Figure 1: The schematic of a Radio Monitoring System.

Figure 2: An Illustration of a repetition of the same program along time-axis.

Figure 3: The Schematic of How Invention is Operated

Figure 4 : The workflow of Exercising the First Grouping and the Second Grouping

METHOD AND APPARATUS FOR AUTOMATIC DETECTION AND IDENTIFICATION OF UNIDENTIFIED BROADCAST AUDIO OR VIDEO SIGNALS

The application claims priority to PCT/US05/04802, filed on Feb. 16, 2005, as a continuation in part, which claims priority to provisional application 60/547,931 filed on Feb. 26, 2004 and to U.S. Provisional Patent Application No. 60/736,348, filed on Nov. 14, 2005, both of which are incorporated herein by reference.

BACKGROUND AND SUMMARY OF THE INVENTION

The present invention relates to a method of detecting and tracking unknown broadcast content items that are periodically encountered by automatic detection and tracking systems. It is known in the art that detection of broadcast content, for example, music broadcast over radio, includes the sampling the of the identified content to compute numerical representations of features of the content, sometimes referred to in the art as a fingerprint, or in the related patent application PCT/US05/04802, filed on Feb. 16, 2004, which is incorporated herein by reference, a pattern vector. These known pattern vectors are stored in a database and while the broadcast signals are received, the same computation is applied to the incoming signal. Then, the detection process entails searching for matches between the incoming computed pattern vectors and the vast database of pre-created pattern vectors associated with the identity of known content.

This system runs into problems when content that has not been registered in the database yet and is being broadcast anyway. In the prior art, these unknown or unmatched programming items would be ignored. This invention is directed to address this shortcoming by determining when a likely piece of programming content has been detected, tracking such detections, and then submitting the piece for human identification in order that proper publishing or other indicia of identity be associated with the content. The system automatically determines which portions of the broadcast signal are previously un-registered content.

DETAILED DESCRIPTION OF THE PREFERRED EMBODIMENTS

Figure 1:
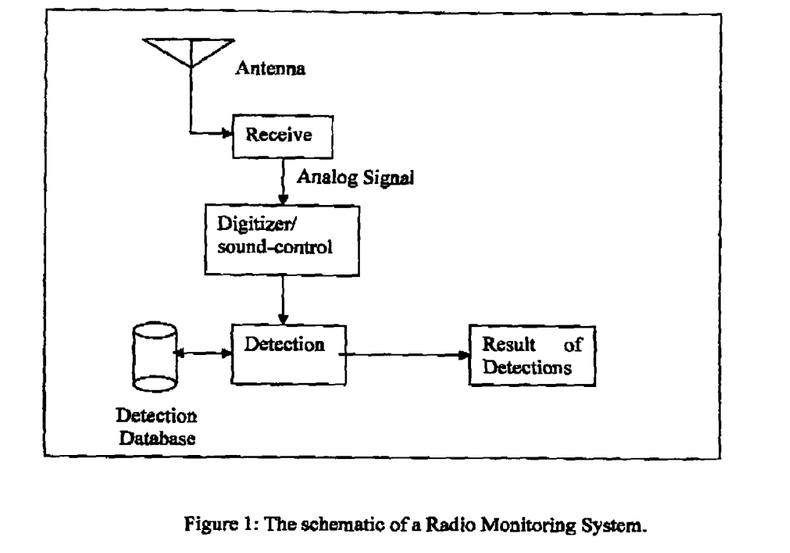
FIG. 1 is a schematic of a Radio Monitoring System.
Figure 2:
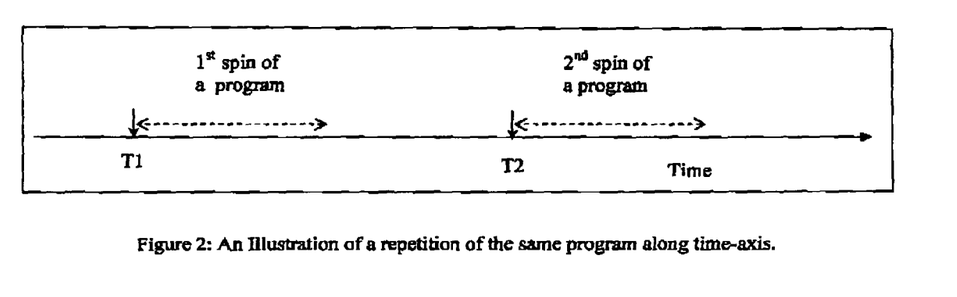
FIG. 2 is an Illustration of a repetition of the same program along the time-axis.
Figure 3:
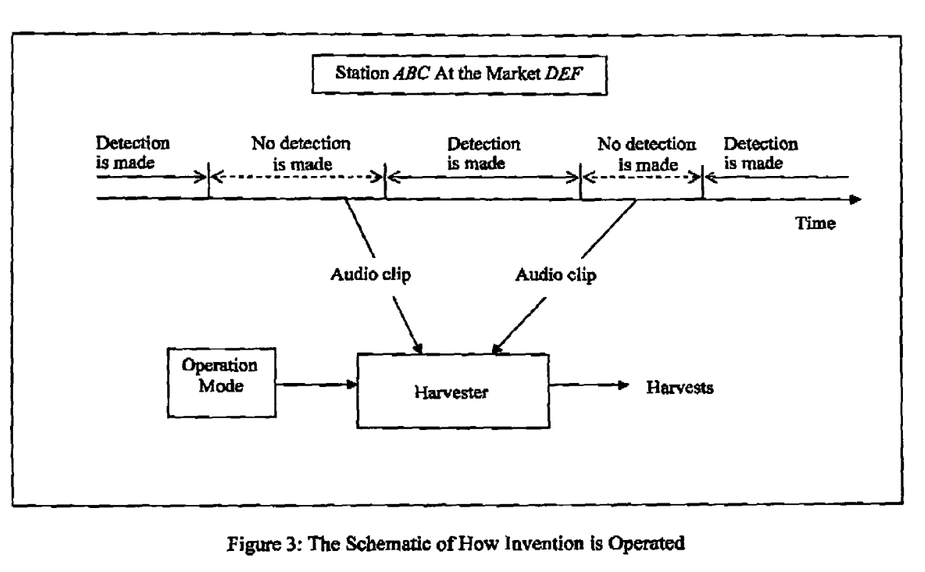
FIG. 3 is a schematic of how the invention is operated
Figure 4:
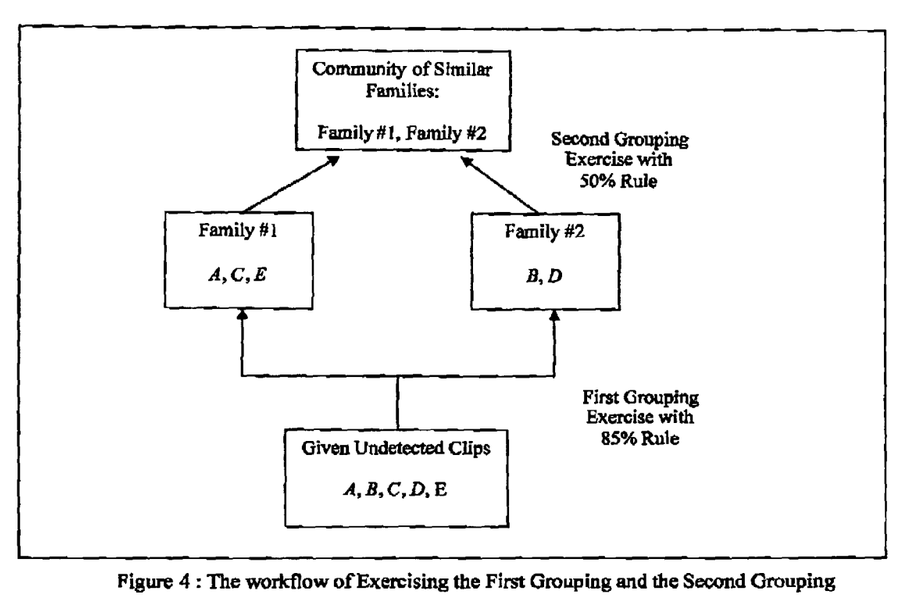
FIG. 4 is the workflow of exercising the first grouping and the second grouping

1. Introduction
Short Coming of a Radio Monitoring System. The core of a modern radio monitoring system (see FIG. 1) is a detection system consisting of a detection algorithm and a database. The database, referred to as the detection database, is populated with identification information of the programs to be detected, e.g. songs and commercial ads. The identification information includes the fingerprint of the program (in this document, the term "pattern" or "pattern vector" will be used instead of "fingerprint"). Signals received from an electronic media broadcast, for example, a radio broadcast are processed to extract patterns at regular intervals in time. Patterns from broadcast are compared with patterns registered in the detection database. A detection is made if a program registered in the database matched with that of the broadcast. Matching includes more than an identical match, but also close matches and a series of matches over time that are determined to be sufficiently consistent with a specific program. The short coming of the system is that detection result is determined by what is being stored in the database. Clearly, if a particular song is not registered in the detection database, the song will never be detected.

A Semi-Automatic Solution. It is a well-known fact that certain programs, particularly songs and commercial ads, are broadcast repeatedly. This repetition provides the opportunity for a detection algorithm to detect programs that have been repeated, even if they are not registered in the detection database. An important principle being employed to design the detection algorithm on repetitive programs is the self-similarity principle. If a program is broadcast at time T1 and is repeated at T2, T2>T1. Programs located along the time-axis at T1 and T2 are said identical.

To detect if a program, which was located at T1, is repeated elsewhere, we can cut out the content located at T1, and run an identification exercise to identify along the time-axis when this piece of content is repeated. We will then identify that program located at T1 if it is repeated at T2. The invention is directed to exercise the self-similarity principle in order to detect unregistered programs that have been repeated. The invention is designed to bring in all programs that have at least one repetition within a pre-determined period of time. The invention can generate results autonomously while other matching and identification processes are running. However, the actual identity of the content of each of the results is not known until it has been listen by human operators. Clearly, listening process is a manual process. Alternatively, the harvested results can be converted to registered content if it turns out that a piece of content is registered whose pattern vectors sufficiently match those associated with content only identified as a unique piece of content as a result of the operation of the invention. In other words, as content is registered in the database, it can be checked to see if it has already been detected by the invention, and the database of detections updated accordingly.

If the invention outputs a identifiable piece of content, referred to herein as a "harvest", such as a new release of a song not actually registered in the database, the pattern vectors of this song that have been recovered by the invention can be extracted from one of the corresponding broadcast signal clips and registered into the detection database of the media monitoring system. By definition, each of the harvests has at least two copies because at a minimum, self-similarity between to instances in time is necessary to determine the repetition that indicates the presence of an individually identifiable piece of content. Selecting which repetition should be registered into the detection database is determined by the audio quality. The invention also includes a step called Audio-Selector, which selects from all the repetitions of the harvested content, the one that has the best audio quality. The pattern vectors computed from this repetition is registered in the database, typically with a unique identification number that is used in lieu of an actual title, because the title is not known yet.

When coupling the invention with an existing media monitoring system, which has detected and identified certain programs along the time, the invention can be set to identify similar programs only during time periods where the monitoring system has not otherwise detected any registered programming. In this mode, the invention is said to be "harvesting on undetected time. Another other mode is to harvest on "all time", including during time periods where registered content has been identified. This approach is seldom used as it is redundant.

The invention can also be exercised to two other ways, one called "batch-mode" and the other "time-progressive" mode. The latter is employed by the preferred embodiment due to more economical use of computer memory and CPU processing time. The detail of time-progressive mode is further described below. In the batch mode, the invention is exercised periodically on a large memory of stored pattern vectors computed from incoming broadcast signals. Every time when it is exercised, the invention will update the harvest with new harvests generated since the last time the invention was operated. In the time-progressive mode, the invention can be exercised at any time at will. The invention is operated to continually seek self-similar repetition among unidentified periods of time in a signal. As harvests are created, the harvested content is then not considered unidentified for these purposes the next time the content is encountered. In addition, the time progressive mode can be used so that the harvests from every media source can be compared to identify content that is self-similar as compared to instances from other geographic regions or distinct media broadcast sources.

Operational Principle of Harvester. The starting point of the invention is to exercise self-similarity detection on individual channels of the incoming broadcast signal. An undetected program is harvested if it has been repeated at least once over a prescribed period TP, characterized with the start time, TS, and the end time, TE. Within TP, the invention will detect programs that are similar to each other. Each harvest is a unique program that occurred at least twice in TP. Each repetition is given an index with an "instance id". Each harvest, indexed with a "family id", has a collection of all the corresponding instance id's.

Self-Similar Detection. The self-similar detection algorithm is used on each individual channel to detect programs that have been repeated more than once within TP. The example presented here is for audio from a radio station, but the invention would work equally well on audio from internet, satellite or any other broadcast medium, or for other media types, including audio-visual works like television programming. Given a piece of audio recording of a radio station, the recording was started at time TS and ended at time TE. A clip referred to as a "bait" is selected from the recording and used as a reference to be matched against with the entire, or a selected portion of the recording. Each clip that has a match to the bait (subject to certain matching criteria) is referred to as a "catch". The timing information of both the bait and each of the catches will be registered as an instance. The timing location information of every (bait, catch) pair is given an instance id.

The self-similarity detection is exercised iteratively: The first bait clip is selected right from the start of the recording. If there is a catch, the second bait clip is selected right after the end of the previous bait clip. Otherwise, the next bait clip is started with a small time offset $\tau>0$ from start of the previous one. The iteration is run until the end of the recording is reached. The detection is based on the similarity of pattern vectors.

Calculation of pattern vectors is describe below, and in further detail in the sister patent application PCT/US05/04802, filed on Feb. 16, 2004, incorporated herein by reference.

In the preferred embodiment, the audio sampling rate is set at 8,000 Hz. These samples are organized into time frames of about 16,384 samples (a frame has a duration of about 2 seconds). Below is the procedure to generate a pattern vector.

Given a frame of 16,384 signal samples:

$\vec{x}=[x[0]\ x[1]\ \Lambda\ x[16384]]$

Take the Fast-Fourier-Transform and obtain 16,384 complex FFT coefficients:

$\vec{X}=[X[0]\ X[1]\ \Lambda\ X[16384]]$

Partition the 16,384 FFT coefficients into 25 subbands, These 25 subbands are a subset of the original 31 subbands originally used for the monitoring system. The following are the indices of FFT's in each subband: Subband #1: 130 to 182; Subband #2: 183 to 255; subband #3: 256 to 357; subband #4: 358 to 501; subband #5: 502 to 702; subband #6: 703 to 984; subband #7: 985 to 1,378; subband #8: 1,379 to 1,930; subband #9: 1,931 to 2,702; subband #10: 2,703 to 3,784; subband #11: 3,785 to 5,298; subband #12: 130 to 255; subband #13: 256 to 501; subband #14: 157 to 219; subband #15: 220 to 306; subband #16: 307 to 429; subband #17: 430 to 602; subband #18: 603 to 843; subband #19: 844 to 1,181; subband #20: 1,182 to 1,654; subband #21: 1,655 to 2,316; subband #22: 2,317 to 3,243; subband #23: 3,244 to 4,541; subband #24: 157 to 306; subband #25: 307 to 602.

The 25 sub-bands cover the frequencies from 63 Hz to 2,587 Hz.

Let Nk=number of elements in the k-th subband, k=1 to 25. Also let Mk={mk[1], mk[2], . . . , mk[Nk]} be the set containing the corresponding indices for the k-th band.

The first order moment, or "centroid", of each subband is then computed. Each centroid lies in the open interval (0,1). Below is the formula:

$$\text{centroid of the } k\text{-th subband} = c_k = \frac{\sum_{n=1}^{Nk} n * X[mk[n]]}{\sum_{n=1}^{Nk} X[mk[n]]}; k = 1 \text{ to } 25$$

The pattern vector for each frame is then $\vec{c}=[c_1\ c_2\ \Lambda\ c_{25}]$.

Extracting Pattern Vectors Using 4 Times (4×) Pattern Vector Sampling

Let the period TP, characterized by the start time $T_S$ and end time $T_E$ of the period, contains N samples: x[1] to x[N]. A pattern is extracted from each frame of signal: The first frame is started from the first sample of TP: x[1] to x[16384].

Frame to frame distance is set at 4,000 samples (0.5 second).

The second frame is from x[4001] to x[20384].

The third frame is from x[8001] to x[24384].

And so on for the remaining frames.

The first frame yields the first pattern vector, denoted as:

$\vec{c}_1=[c_{1,1}\ c_{1,2}\ \Lambda\ c_{1,25}]$

The last frame yields $\vec{c}_M=[c_{M,1}\ c_{M,2}\ \Lambda\ c_{M,25}]$ where

M=lower integer of (N−16384)/4000+1.

The start time of each frame is taken as the time location of the corresponding pattern vector. Thus, the time location for $\vec{c}_1$ is at $T_S$. And for, the time location for $\vec{c}_2$ at $T_S$+4000/8000 sec=$T_S$+0.5 sec, and so on.

Self Similarity Detection Using the One-Times Pattern Vector as the Query

Starting from C_1, take every fourth pattern vector:
$\check{C}_1, \check{C}_5, K$ And assign them to query vectors D as:
$\check{b}_{x1} = \check{C}_1$
$\check{b}_{x2} = \check{C}_5$
$\check{b}_{x3} = \check{C}_9$ The result is a total of Q query vectors: to $\check{b}_{x1}$ to $\check{b}_{xQ}$, where Q=Quotient of M/4. The time location of $\check{b}_{x1}$ is that of $\check{C}_1$. And the time location of $\check{b}_{x2}$ is that of $\check{C}_5$. These 1×Q vectors will be used one by one to query the 4× pattern vectors of $\check{C}_1$ to $\check{C}_M$.

Self-Similarity Detection

To facilitate the disclosure purposes, designate C and D as the sets that hold the 4× and the 1× pattern vectors respectively:
C=[ $\check{C}_1$ $\check{C}_2$ Λ $\check{b}_{xQ}$
D=$\check{b}_{x1}$ $\check{b}_{x2}$ Λ $\check{b}_{xQ}$]

Store every 4× pattern vector into a database. We will refer this database as the self-similar-detection database, abbreviated as SSD. The index for each of these pattern vectors is the time-stamp of each frame.

TABLE 1

A Self-Similarity Detection Database

| Index | 1st Subband | 2nd Subband | 3rd Subband | ... | 25th Subband |
|---|---|---|---|---|---|
| 1 | $D_{1,1}$ | $D_{1,2}$ | $D_{1,3}$ | ... | $D_{1,25}$ |
| 2 | $D_{2,1}$ | $D_{2,2}$ | $D_{2,3}$ | ... | $D_{2,25}$ |
| Λ | Λ | Λ | Λ | ... | Λ |
| Q | $D_{Q,1}$ | $D_{Q,2}$ | $D_{Q,3}$ | ... | $D_{Q,25}$ |

The method of the invention begins with the Phase I Detection: Generating Catch Threads. The process is described as below using pseudo code. The BlockSize is a parameter which can be freely set. In the preferred embodiment, it is set to 5, corresponding to a time duration of approximately 10 seconds.

```
Set BlockSize = 5
Set p = 1.
Loop: While p < = Q – (BlockSize – 1) :
    Read pattern vectors: b̌_p to b̌_{p+BlockSize-1} // Start a new bait by using
    these five pattern vectors (corresponding to approximately 10 seconds
    audio) as the first five 1× pattern vectors of the bait.
    Let the query be b̌_r, r = p to p + BlockSize – 1 :
    Query each of the five pattern vectors to the SSD.
    Check whether the returning pattern vectors satisfy the gap
    requirement and the error-bound requirement.
```

Practitioners of ordinary skill will recognize that matching is not necessarily an exact match but a sufficient match. Hence, matching is determined if appropriate conditions are met between the pattern vector in the query and a pattern vector in the database. The first requirement is called the Gap Requirement.

Gap Requirement: A pattern, $\check{C}_k \in C$, is said satisfied with the gap-requirement if the absolute point error between $\check{C}_k$ to $\check{b}_r$ is within some prescribed bound:
$|c_{k,q} - d_{r,q}| \leq g_q$; q=1 to 25; $g_q$ is the gap set for the q-th subband.

Note that the gap can be set individually for each subband. In the preferred embodiment, $g_q$ is set to about 0.1 uniformly on all subbands. However, these parameters can be adjusted to balance false positive identifications against false negatives, processing times and the like. For the purposes of this disclosure, let RG be the set of pattern vectors in C that satisfy the gap requirement with respect to query set $\check{b}_r$.

Error-bound requirement: A pattern vector, $\check{C}_s \in C$, is satisfies the error-bound requirement if the Norm-1 error between $\check{C}_s$ to $\check{b}_r$ is less than some prescribed bound $$\sum_{n=1}^{25} |c_{s,n} - d_{r,n}| \leq B_e$$

In the preferred embodiment, $B_e$ is set at about 0.8.

Let RE be the set of pattern vectors in C that satisfy the error bound requirement with respect to query set $\check{b}_r$.

Let RF=RG∩RE. Then RF is the set of all pattern vectors in C that satisfy both the gap and the error-bound requirements. Also, let E1 be the set of corresponding Norm-1 errors. The five query patterns: $\check{b}_p$ to $\check{b}_{p+4}$, will have respectively $RF_p$ to $RF_{p+4}$ as the pattern sets that satisfy both requirements, and $E1_p$ to $E1_{p+4}$ as the sets holding the corresponding Norm-1 error values.

Let $RF_0$ to $RF_4$ be the five sets of pattern vectors with respect to the querying of $\check{b}_p$ to $\check{b}_{p+4}$. This step is about building up "qualified threads". In this step, a thread Th is a sequence of five frames:

Th: $\check{C}_{F0} \rightarrow \check{C}_{F1} \rightarrow \check{C}_{F2} \rightarrow \check{C}_{F3} \rightarrow \check{C}_{F4}$ where $\check{C}_{F0}$ is selected from $RF_{p+1}, \ldots$, and $\check{C}_{F4}$ is selected from $RF_{p+4}$. The offset of the index of two subsequent frame, e.g. $\check{C}_{F0}$ and $\check{C}_{F1}$, in the thread has to satisfy the following Sequencing-Rule:

Sequencing-Rule: The index F1 has a offset between 2 to 7 relative to F01. This offset is based on the 4× sampling of pattern vectors in C and 1× sampling of pattern vectors in D. Thus, for every advancement of one frame in D, we expect a four frame advancement in C. Thus, the offset of index between F0 and F1 should be equal to 4. In the preferred embodiment, a range of 2 (4−2) to 7 (4+3) is allowed for such offset is due to the robustness consideration.

```
Steps for Sequencing Rule Test:
    Set the number of threads equal to the number of elements in
    RF_0 = N_T.
    Each of the elements of RF_0 is the first frame of each of the N_T
    threads.
        Let Th_{p,q} be the q-th element, q = 0 to 4, of the p-th thread,
        p = 1 to N_T.
    Loop: For n = 1 to N_T : (n is the thread index)
        Loop: for q = 1 to BlockSize – 1 : (q = the element of the p-
        th thread)
            Select from the set RF_q members that satisfy the
            sequencing rule to the element Th_{n,q-1}.
            If there exists member(s) in RF_q that satisfied with the
            Sequencing-Rule,
            Select the one(s) that has the smallest error (the error
            values are stored in E1_q) as the new thread element T_{n,q}.
            Else
            The n-th thread is disqualified from further threading.
```

[1] This offset is based on the 4× sampling of pattern vectors in C and 1× sampling of pattern vectors in D. Thus, for every advancement of one frame in D, we expect a four frame advancement in C. Thus, the offset of index between F0 and F1 should be equal to 4. A range of 2 (4−2) to 7 (4+3) is allowed for such offset is due to the robustness consideration.

Collect all qualified threads Each qualifying thread is required to pass the Sequencing-Rule between all the Block-Size frames, as described above. As a result all threads that fail to pass the Sequencing-Rule between any pair of subsequent are disqualified. If the number of qualified threads is greater than zero, then the process applies a time restraint test to the thread.

In particular, the process examines the time location of each qualified thread:

---

Remove threads with time location "earlier" than $+t_m$ ($t_m \geq 0$) minutes from the time location of $\vec{b}_6$ (This step is used to restrict time locations of all catch threads be at least tm minutes "after" the time location of the lead-thread.). In the preferred embodiment, $t_m$ is set to 5 minutes3. (Setting tm = 5 minutes excludes all catches with time locations within 5minute to the bait.)
Remove time-overlapped threads:
    If two threads are overlapped in time, remove the one that has the larger accumulated error.
Analyze the quality of each remaining thread with the duration-ratio test:
Given the thread $Th_p$ that is still qualified, its duration-ratio is calculated with the following formula:
duration ratio = $(16384+(Th_{p,4} - Th_{p,0})*4000)/(16384 + 4*16000)$
If the duration ratio is outside the interval (min_ratio, max_ratio), the thread $Th_p$ is removed.

---

2 This step is used to restrict time locations of all catch threads be at least $t_m$ minutes "after" the time location of the lead-thread.
3 Setting $t_m$=5 minutes excludes all catches with time locations within 5 minute to the bait.

In the preferred embodiment, min_ratio is set to 0.90, and max_ratio is set to 1.10—allowing +/−10% duration variance. If the number of remaining qualified threads is greater than zero, these remaining threads are subject to the next stage of the process.

Phase II Detection: Tracking on Qualified Threads. The phase II tracking step involves tracking the remaining qualified threads. This step of the analysis process shall be presented as pseudo-code.

---

Let the number of remaining qualified threads = $N_u$.
Denote the k-th qualified thread as $Th_k$
Set the MaxStep (an integer) = 1.
Set q = BlockSize − 1.
Set Steps[n] = 0, n = 1 to $N_u$.
Set EndRegister[n] = 1, n = 1 to $N_u$.
Set MinStep = 1.
Loop: While MinStep < MaxStep
  Set q = q + 1.
  Read the next query: $\vec{b}_{p+q}$ is sent to the to the SSD to obtain the corresponding $RF_q$ and $E1_q$.
  For loop: for n = 1 to $N_u$
    Select from the set $RF_q$ members that satisfy the sequencing rule relative to the element $T_{n,q-1}$. (Note that the Sequencing-Rule requires two adjacent frames in the n-th thread to have an offset between 2 to 7. In this loop, the Sequencing-Rule is generalized to be as offset between two adjacent frames is between Steps[n]*4+2 to Steps[n]*4+7.)
    If there exists at least one member in $RF_q$ that meets the test, select the one that has the least error (the error values are stored in $E1_q$) as the new thread element $T_{n,q}$.
      Set Steps[n] = 1.
    Else
      Set $T_{n,q}= T_{n,q-1}$.
      Set Steps[n] = Steps[n]+1.(Note in this step, the register in Steps[n] is used as a 'skipped' counter. In particular, a thread may have a skip in the q-th query, i.e. There exists no frame in RFq that is satisfied with the Sequencing-Rule relative to Tn, q − 1. Every time where there is a skip, the register Steps[n] is incremented. However, as long as there is no skip, the register Steps[n] is reset to 1.)
End For loop.
For loop: For n = 1 to $N_u$
  If Steps[n] > MaxStep,
    EndRegister[n] = q − 1. (Once the n-th thread has reached the maximum skips denoted by MaxStep, the location where the maximum skips reached is marked and registered in EndRegister[n].)
End the For loop.
  Compute MinStep = min(Steps[n]). (The variable MinStep is the smallest number of skips across all qualified threads. The threading will continue until MinStep is larger than MaxStep, which is specified to limit the maximum number of skips.)
End the While loop.

---

Now the phase II process proceeds to measure the duration of each thread, the duration information of each n-th thread is registered in EndRegister[n].

---

Loop: For n = 1 to $N_u$
  Enter the four parameters to characterize each of the n-th thread $Th_n$:
  start_time = p
  end_time = p + EndRegister[n].
  First_frame_id = $T_{n,0}$
  Last_frame_id = $T_{n,EndRegister[n]}$
End the For Loop.

---

Pair up the bait and every catch into an instance: Here, every catch will be paired up with the bait. The start-time and the end-time of the bait and the catch, as well as the channel id (such as the channel's call-letter) will be logged. An instance id is generated to every bait-catch pair. An instance consists of:

{instance id; channel id; start-time/end-time of the bait; start-time/end-time of the catch}.

Once this is complete, the entire iteration of the loop beginning at Phase I is complete. In pseudo code:

---

Set p = p + q + 1. (Start the next bait right after the end of the previous bait.)
  Else
    p = p + 1.
Else
  p = p + 1.
End the While loop initiated at the beginning of Phase I.

---

Self-Similarity Detection on Undetected Clips Only. As mentioned above, the invention can be operated in two operational modes: harvesting at "all-time", and harvesting in "undetected-time". In the "all-time" mode, all programs within TP that have been repeated more than once within TP are detected and harvested. With a radio monitoring system in place, certain spots within TP have already been detected and identified by the monitoring system. The invention can be exercised more effectively on clips where the radio monitoring system has not made detection. In this mode, the invention is said to be harvesting just the undetected time.

Running the invention in the undetected time requires some modification to what was presented as the process presented above. Departures from the all-time mode is presented as follows: The Self-Similar Database (SSD) is registered with clips where no detection were made by the monitor. The audio quality of each clip is measured.

There are a total of three quality scores per clip: The RMS power of the clip represented here as a vector of h samples: $\underline{P}=[z_1\ z_2\ \Lambda\ z_h]$, is equal to $$P_z = 10 * \log\left(\frac{1}{h}\sum_{n=1}^{h}|z_n|^2\right) dB$$

If $P_z$ is below −30 dB, the audio power of the clip is too low and will not be considered. The second is the mean 1st order auto-correlation of the patterns of the clip: The 4× patterns of the clip is obtained: $\{\underline{\mathcal{E}}_k^z, k=1,2,K,r\}$, and then extracted are the 1× patterns: $\underline{b}_n^z = \underline{\mathcal{E}}_{4n-3}^z, n=1,2,K, R=$quotient(r/4). Also calculated are the mean 1st order $$\text{auto-correlation} = \frac{1}{R-1}\sum_{n=1}^{R-1}\left(\sum_{m=1}^{25} D_{n,m}^z * D_{n+1,m}^z\right).$$

If the mean value is higher than 0.99, the clip is believed to be contaminated with too much static. On the other hand, if the mean value is lower than 0.80, the clip is believed to be merely containing channel noise. In both cases the clip is unusable. These threshold numbers may be adjusted up or down to adjust for false-positive versus false negative rates of identification as required in the specific application of the invention. Also calculated is the vigilance of the clip: The vigilance is a measure of the clarity, characterized by norm-1 difference between adjacent 1× pattern vectors.

$$\text{vigilance} = \frac{1}{R-1}\sum_{n=1}^{R-1}\left(\sum_{m=1}^{25}|D_{n,m+1}^z - D_{n,m}^z|\right)$$

The vigilance value is required to surpass a minimum score of 0.95. This threshold is used in the preferred embodiment, but may be adjusted based on the application of the invention.

The SSD is structured with the additional parametric data as follows:

TABLE 2

A Self-Similarity Detection Database Appended with Indices on Undetected Clips

| Undetected Clips | RMS power | Mean 1st-order correlation | Vigilance | Pattern index | $1^{st}$ Subband | $2^{nd}$ Subband | ... | $25^{th}$ subband |
|---|---|---|---|---|---|---|---|---|
| Clip #1 | RMS Power of Clip #1 | Mean 1st-order correlation For Clip #1 | Vigilance For Clip #1 | (1, 1) (1, 2) $\Lambda$ (1, $M_1$) | $D_{1,1}^1$ $D_{2,1}^1$ $\Lambda$ $D_{M_1,1}^1$ | $D_{1,1}^1$ $D_{2,2}^1$ $\Lambda$ $D_{M_1,2}^1$ | $\Lambda$ $\Lambda$ $\Lambda$ $\Lambda$ | $D_{1,25}^1$ $D_{2,25}^1$ $\Lambda$ $D_{M_1,25}^1$ |
| Clip #2 | RMS Power of Clip #2 | Mean 1st-order correlation For Clip #2 | Vigilance For Clip #2 | (2, 1) (2, 2) $\Lambda$ (2, $M_2$) | $D_{1,1}^2$ $D_{2,1}^2$ $\Lambda$ $D_{M_1,1}^2$ | $D_{1,1}^2$ $D_{2,2}^2$ $\Lambda$ $D_{M_1,2}^2$ | $\Lambda$ $\Lambda$ $\Lambda$ $\Lambda$ | $D_{1,25}^2$ $D_{2,25}^2$ $\Lambda$ $D_{M_1,25}^2$ |
| $\Lambda$ | $\Lambda$ | $\Lambda$ | $\Lambda$ | $\Lambda$ | $\Lambda$ | $\Lambda$ | $\Lambda$ | $\Lambda$ |
| Clip #S | RMS Power of Clip #S | Mean 1st-order correlation For Clip #S | Vigilance For Clip #S | (S, 1) (S, 2) $\Lambda$ (S, $M_S$) | $D_{1,1}^S$ $D_{2,1}^s$ $\Lambda$ $D_{M_1,1}^S$ | $D_{1,1}^S$ $D_{2,2}^S$ $\Lambda$ $D_{M_1,2}^S$ | $\Lambda$ $\Lambda$ $\Lambda$ $\Lambda$ | $D_{1,25}^S$ $D_{2,25}^S$ $\Lambda$ $D_{M_1,25}^S$ |

The clips registered into the SSD can be arranged in the order of the time location of each clip. Thus, Clip #1 preceded Clip #2, which preceded Clip #3, and so on. The exercising of the self-similarity detection algorithm is to take one clip at a time as the bait to match with all the later clips. Clips that failed the quality requirement will be excluded from the self-similarity detection exercise. The matched instances are registered onto a database:

TABLE 3

Self-Similarity Detection Information between Undetected Clips are logged onto a Database.

| Clip/ | Clip | | | | |
|---|---|---|---|---|---|
| | Clip #1 | Clip #2 | Clip #3 | ... | Clip #S |
| Clip #1 | | Instance_id + similar information between #1 and #2 | Instance_id + similar information between #1 and #3 | ... | Instance_id + similar information between #1 and #M |

TABLE 3-continued

Self-Similarity Detection Information between Undetected Clips are logged onto a Database.

| Clip/ | Clip | | | | |
|---|---|---|---|---|---|
| | Clip #1 | Clip #2 | Clip #3 | ... | Clip #S |
| Clip #2 | | | Instance_id + similar information between #2 and #3 | ... | Instance_id + similar information between #2 and #M |
| ... | ... | ... | ... | | ... |
| Clip #S − 1 | | | | | Instance_id + similar information between #M − 1 and #M |
| Clip #S | | | | | ... |

Harvesting—Mining Harvests from Similar Instances

The instances collected during the self-similarity detection exercise will be processed to identify harvests from the instances. Consider the following scenario where a commercial advertisement with duration of 30 seconds has been repeated in five different time locations within the harvesting period TP.

Five undetected clips, namely, A, B, C, D and E, where A preceded B, B preceded C, C preceded D, and D preceded E, are checked into the SSD. Each clip contains the said commercial advertisement. The time duration of each clip is arbitrary but all longer than 30 seconds.

The self-similarity detection algorithm will then use A and the bait and result with four instances $B^0/A^0$, $C^0/A^1$, $D^0/A^2$ and $E^0/A^3$.

Here, $A^0$, a segment in A, is the clip found to be similar to $B^0$, a segment in B.

Likewise, $A^1$, a segment in A, is the clip found to be similar to $C^0$, a segment in C.

Thus, the self-similarity detection algorithm will also yield the following instances:

With B as the bait: $C^1/B^1$, $D^1/B^2$, $E^1/B^3$,
With C as the bait: $D^2/C^2$, $E^2/C^3$,
With D as the bait: $E^3/D^3$.

The 5 instances can be eloquently represented into a table form:

The Instance Table

| Clip | Clip | | | | |
|---|---|---|---|---|---|
| | A | B | C | D | E |
| A | | $B^0/A^0$ | $C^0/A^1$ | $D^0/A^2$ | $E^0/A^3$ |
| B | | | $C^1/B^1$ | $D^1/B^2$ | $E^1/B^3$ |
| C | | | | $D^2/C^2$ | $E^2/C^3$ |
| D | | | | | $E^3/D^3$ |
| E | | | | | |

There are a total of ten instances, containing the five repetitions of the advertisements.

Also note that there are overlaps among themselves. For example, $A^0$, $A^1$, $A^2$ and $A^3$ are the audio clips that contain the first occurrence of the advertisement, except that they are differed slightly in time-offsets and time-durations.

Two processes are used to mine harvests from all the instances. The first process is called Identification. The major purpose of this process is identify the best representation from the multiple catches of the same clip. For example, the 4 clips: $A^0$, $A^1$, $A^2$ and $A^3$ are multiple catches containing the same content—all of them contain the first occurrence of the advertisement. The Identification process selects the most representable out of these four catches. The second process is the Grouping exercise where all similar clips, in this case the 5 occurrences of the same advertisements, are being grouped into the same group.

Identification Process.

There are two steps in the Identification Process:
The first step is to run overlapping detection exercises to identify clips that have time overlaps.
The second step is to select the most representable from all overlapped clips identified in the first step.

The same example is used to illustrate the two steps taken in the Identification Process:
Collect all the clips that have been detected by the self-similarity detection algorithm within the time period TP.
In the same example, we have a total of twenty clips:
$A^0, A^1, A^2, A^3$,
$B^0, B^1, B^2, B^3$,
$C^0, C^1, C^2, C^3$,
$D^0, D^1, D^2, D^3$,
$E^0, E^1, E^2, E^3$.

Note that each of the above clips is either a bait or a catch. All the clips are then compared with each other to identify if the two has time overlap.

Determination of time-overlap of two clips are given below:
Given two clips, say X and Y.
If X and Y have time overlap AND the overlap duration is within +/−6 seconds of the shorter of the two clips. Then X and Y are said overlapped.
If X and Y is determined to have overlapped, then the shorter of the two clips is replaced by the longer one. This is being done so due to the notion that the longer one can contain more information and is therefore more representable.

Thus, given the four clips that are overlapped: $A^0$, $A^1$, $A^2$, $A^3$, only one clip will survive the identification process. The following results are obtained after exercising the Identification process on the twenty clips:
$A^0, A^1, A^2, A^3$-------->$A^2$ is the winner.
$B^0, B^1, B^2, B^3$-------->$B^0$ is the winner.
$C^0, C^1, C^2, C^3$-------->$C^3$ is the winner.
$D^0, D^1, D^2, D^3$-------->$D^0$ is the winner.
$E^0, E^1, E^2, E^3$-------->$E^2$ is the winner.

Thus, only five clips are identified from 10 instances.

Grouping Process

The example five clips identified in the Identification process above are determined if they can be grouped into a single family. A family is a collection of clips which passed the Sufficient-Similarity test.

Sufficient-Similarity Test

Two clips, X and Y are said sufficient-similar if both satisfy the "85% Rule": The duration of the similar segment is no less than 85% of the durations of either clips. This percentage is a configuration parameter. Clearly, the higher the percentage, the tighter the similarity requirement. The 85% number used by the preferred embodiment can be adjusted higher or lower depending on the application of the invention. To determine if X and Y are sufficient similar:

The similarity segment across X and Y is first identified.

The duration of the segment on X is measured.

Compute the similarity ratio, $R_1$, of this duration to the duration of X.

The duration of the segment on Y is measured.

Compute the similarity ratio, $R_2$, of this duration to the duration of Y.

X and Y are said sufficient-similar if $\min(R_1, R_2) \geqq 85\%$.

Otherwise, the two clips are not sufficient-similar.

Group all sufficient-similar clips into a single family.

A family id is generated.

The family contains all the information of all the family members, including the channel id, time location, and audio quality measures.

The Grouping process can be represented by a transition of the Instance Table: Start with the Instance Table after the self-similarity detection exercise:

The Instance Table
Replace clips with their representative clips within the Instant Table

| Clip | A | B | C | D | E |
|---|---|---|---|---|---|
| A |  | $B^0/A^0$ | $C^0/A^1$ | $D^0/A^2$ | $E^0/A^3$ |
| B |  |  | $C^1/B^1$ | $D^1/B^2$ | $E^1/B^3$ |
| C |  |  |  | $D^2/C^2$ | $E^2/C^3$ |
| D |  |  |  |  | $E^3/D^3$ |
| E |  |  |  |  |  |

The Instants Table after Identification Process

| Clip | $A^2$ | $B^0$ | $C^3$ | $D^0$ | $E^2$ |
|---|---|---|---|---|---|
| $A^2$ |  | $B^0/A^2$ | $C^3/A^2$ | $D^0/A^2$ | $E^2/A^2$ |
| $B^0$ |  |  | $C^3/B^0$ | $D^0/B^0$ | $E^2/B^0$ |
| $C^3$ |  |  |  | $D^0/C^3$ | $E^2/C^3$ |
| $D^0$ |  |  |  |  | $E^2/D^0$ |
| $E^2$ |  |  |  |  |  |

The Cross-Similarity Table

| Clip | A | B | C | D | E |
|---|---|---|---|---|---|
| A |  | $R_1, R_2$ | $R_1, R_2$ | $R_1, R_2$ | $R_1, R_2$ |
| B |  |  | $R_1, R_2$ | $R_1, R_2$ | $R_1, R_2$ |
| C |  |  |  | $R_1, R_2$ | $R_1, R_2$ |
| D |  |  |  |  | $R_1, R_2$ |
| E |  |  |  |  |  |

Compute the similarity ratio across clips

Check if the two ratios in each entry are above 85%. If so, the clips of that entry are said sufficient-similar.

Collect sufficient-similar clips into a single family.

Besides identifying family member from the Cross-Similarity Table, the following rule is also used to collect family members:

If X and Y are sufficient-similar, and Y and Z are also sufficient similar, then X and Z are said sufficiently similar.

Selecting Family Representative Member

A family has at least two members. Again, based on the belief that longer clip is more informative than shorter clip, the family member that has the longest duration is selected as the "Lead Member" of the family.

Quality Control with Family Lead's Member

After a lead member has been selected, the duration-ratio of the overlap between the representative member to each family members will be re-measured. Those that fail the 85% Rule will be discarded from the family.

Effectiveness of the Grouping Process on Back-to-Back Advertisements Within the harvesting period NT, a particular advertisement were repeated a number of times. And in some of these spins, the advertisement was purposely paired up back-to-back with another advertisement. For example, a MacDonalds special combo advertisement may, from time to time, be purposely paired up with a Coca-cola advertisement. It is often desirable to separate the these catches, though they are similar, into two different families. The Sufficient-Similarity Test is an effective mean for separating these instances.

With our running examples with five clips: A, B, C, D, and E. Here, A, C and E contain a MacDonald special combo advertisement; while B and D are the MacDonald Special Combo advertisement followed by a Cocacola advertisement.

The resulting Cross-Similarity Table is expected to be similar to:

Cross-Similarity Table

| Clip | A | B | C | D | E |
|---|---|---|---|---|---|
| A |  | 0.95, 0.48 | 0.96, 093 | 0.91, 0.50 | 0.98, 0.96 |
| B |  |  | 0.47, 0.90 | 0.91, 0.93 | 0.48, 0.91 |
| C |  |  |  | 0.93, 0.47 | 0.89, 0.92 |
| D |  |  |  |  | 0.46, 0.88 |
| E |  |  |  |  |  |

Clearly, both B and D will not be combined with A, C and E into the same family. Instead, A, B and C will be combined into one family; and B and D will be combined into another family.

Second Membership in Grouping Process.

The term "membership" originated from classical set theory. For example, the number $\pi$ is a member of the set of all real numbers, but not a member of the set of integers. Referring above where the rule—referred to as the "85% Rule"—is used to determine if two clips are sufficiently similar to be grouped into the same family. Those that pass the condition will be grouped together as family members. The membership on the family level is referred to as the "First Membership". The "Second Membership" is referred as the grouping of families—Similarity of representative members of two families are measured. The two will be grouped if the similarity surpasses some prescribed threshold value. Same grouping rule on the First Membership is used on the Second Membership. The threshold value for the second membership is set at 50%, or the 50% Rule is used for this second grouping exercise. The preferred embodiment uses the 50% threshold for the second membership test, but this value can be adjusted up or down depending on the application of the invention. The purpose of creating the second grouping process is to provide additional information to human operators to speedup identifying harvests, that is, having operators determine the actual identity of content that is harvested but has not been identified with title and publisher information.

This is illustrated in the following example:
Assume five clips: A, B, C, D and E containing two similar 60-second advertisements. All the five advertisements are identical in the first 40 seconds, carrying the dedicated channel message. The last 20 seconds are different, carrying the advertised product information. The clips A, C and E contain the first advertisement. And D and E contain the second advertisement. The first grouping exercise will result with two distinct families:
Family #1 containing A, C and E.
Family #2 containing B and D.

The results of the first grouping exercise do not convey the information that Family #1 and Family #2 are similar. The second grouping exercise will group both families into a common group, referred to as a "Community" and a community_id will be assigned, conveying that the two families are similar with respect to the 50% Rule. From the data presentation point of view, the second grouping exercise results with "minks", where each trunk carries a number of families, which are branches connected to the same trunk. Human operators may first run a coarse analysis on a trunk, finding out what is the common message within the entire trunk (e.g. a Discovery-Channel advertisement), then pay attention to what are the specifics to each family (e.g. different video programs).

Time Progressive Harvesting

The basic units of the Harvesting exercise are the bait-catch instants being detected in the self-similarity detection exercise. Exercising of the self-similarity detection algorithm can be in the batch-mode, where the self-similarity exercise is working on a particular time period NT. If NT is a very long period, the self-similarity detection can be exercised in the time-progressive mode. In this mode, the period NT is being divided into smaller intervals. For example, the period NT is a 12 hour period starting at 00:00 to 12:00. One can divided the period into two 6-hour period:
NT_1: 00:00 to 06:00
NT_2: 06:00 to 12:00
Exercise the self-similarity detection on the first interval:
Build the Instance Table.
Example: In NT 1, there are 5 undetected clips, A, B, C, D, and E.
Thus, the Instant Table is a 5×5 table:

|      |   | Clip | | | |
|------|---|---|---|---|---|
| Clip | A | B | C | D | E |
| A    |   | Instance_id + Similarity information across A and B | Instance_id + Similarity information across A and C | Instance_id + Similarity information across A and D | Instance_id + Similarity information across A and E |
| B    |   |   | Instance_id + Similarity information across B and C | Instance_id + Similarity information across CBand D | Instance_id + Similarity information across B and E |
| C    |   |   |   | Instance_id + Similarity information across C and D | Instance_id + Similarity information across C and E |
| D    |   |   |   |   | Instance_id + Similarity information across D and E |
| E    |   |   |   |   |   |

Assume there are five undetected clips: F, G, H, I, and J, in NT_2.
Append the five new clips from NT_2 onto the Instant Table:

TABLE 4

Instance Table Updating in the Time-Progressive Mode. The non-shaded entries are the similarity information on NT_1. The shaded entries are the similarity information appended after the self similarity detection exercise on NT_2.

|      |   | Clip | | | | |
|------|---|---|---|---|---|---|
| Clip | A | B | C | D | E | F |
| A    |   | Instance_id + Similarity information across A and B | Instance_id + Similarity information across A and C | Instance_id + Similarity information across A and D | Instance_id + Similarity information across A and E | Instance_id + Similarity information across A and F |

TABLE 4-continued

Instance Table Updating in the Time-Progressive Mode. The non-shaded
entries are the similarity information on NT_1. The shaded entries are the similarity
information appended after the self similarity detection exercise on NT_2.

| | | | | | |
|---|---|---|---|---|---|
| B | | Instance_id + Similarity information across B and C | Instance_id + Similarity information across CBand D | Instance_id + Similarity information across B and E | Instance_id + Similarity information across B and F |
| C | | | Instance_id + Similarity information across C and D | Instance_id + Similarity information across C and E | Instance_id + Similarity information across C and F |
| D | | | | Instance_id + Similarity information across D and E | Instance_id + Similarity information across D and F |
| E | | | | | Instance_id + Similarity information across E and F |
| F | | | | | |
| G | | | | | |
| H | | | | | |
| I | | | | | |
| J | | | | | |

| | | Clip | | | |
|---|---|---|---|---|---|
| | Clip | G | H | I | J |
| | A | Instance_id + Similarity information across A and G | Instance_id + Similarity information across A and H | Instance_id + Similarity information across A and I | Instance_id + Similarity information across A and J |
| | B | Instance_id + Similarity information across B and G | Instance_id + Similarity information across B and H | Instance_id + Similarity information across B and I | Instance_id + Similarity information across B and J |
| | C | Instance_id + Similarity information across C and G | Instance_id + Similarity information across C and H | Instance_id + Similarity information across C and I | Instance_id + Similarity information across C and J |
| | D | Instance_id + Similarity information across D and G | Instance_id + Similarity information across D and H | Instance_id + Similarity information across D and I | Instance_id + Similarity information across D and J |
| | E | Instance_id + Similarity information across E and G | Instance_id + Similarity information across E and H | Instance_id + Similarity information across E and I | Instance_id + Similarity information across E and J |
| | F | Instance_id + Similarity information across F and G | Instance_id + Similarity information across F and H | Instance_id + Similarity information across F and I | Instance_id + Similarity information across F and J |
| | G | | Instance_id + Similarity information across G and H | Instance_id + Similarity information across G and I | Instance_id + Similarity information across G and J |
| | H | | | Instance_id + Similarity information across H and I | Instance_id + Similarity information across H and J |
| | I | | | | Instance_id + Similarity information across I and I |
| | J | | | | |

The new entries are generated by running the self similarity detection process described above on both the old and the new undetected clips. In the time progressive mode, the size of SSD is limited. In this example, the size of the SSD on NT_2 is half to the SSD in the batch mode. Also note that in harvesting NT-2, all the undetected clips in NT_1 and NT_2 will be used as queries to the SSD. New results in each partition will be appended to the Instance Table. The partition size of NT can be arbitrarily fine, as determined by the application. Also, partitions are not required to be uniform, that is, a partition can be set for each clip. After the Instance Table has been appended with new results, both the Identification and the Grouping processes can be exercised to identify append new members to existing families, or to identify new families.

Cross Channel Harvesting

The harvester exercise on a single channel can be easily applied to harvest similar clips across different channels. In other words, it might be desirable to find self-similarity of content clips not just across time, but across other broadcast sources, where it is assumed that sufficiently similar clips on two distinct broadcast sources is likely an identifiable piece of content. The process is performed as follows: First, select families from channels to be compared. To save computational efforts, certain criteria are set on what kind of families are to be selected for the exercise. Below are three criteria that can be used:

Clips with similar durations.

Clips from stations of similar formats.

Clips that appear most recently, e.g. within 24 hours.

Recall that every family has a lead member clip. The process registers each lead clip from the selected families, of selected channels, into the SSD. Then the self-similarity detection exercise is run on the SSD. The resulting similarity information is entered into an Instance Table.

TABLE 5

Instance Table in a Cross-Channel Exercise

| Clip | Clip | | | | |
|---|---|---|---|---|---|
| | Lead Clip from family #1 of channel #1 | Lead Clip from family #2 of channel #1 | Lead Clip from family #1 of channel #2 | Lead Clip from family #2 of channel #2 | Lead Clip from family #1 of channel #3 |
| Lead Clip from family#1of channel #1 | | similarity information | similarity information | similarity information | similarity information |
| Lead Clip from family#2of channel #1 | | | similarity information | similarity information | similarity information |
| Lead Clip from family#1of channel #2 | | | | similarity information | similarity information |
| Lead Clip from family#2of channel #2 | | | | | similarity information |
| Lead Clip from family#1of channel #3 | | | | | |

The similarity information will be processed via the Grouping Process with the 85% Rule to identify similar families across different channels. All similar families will be combined into a combined family. A combined-family identification number will be generated for the combined family. Each combined family consists of families of different channels. These families are combined due to high degree of similarity among their lead members. The combined family thus contains all informations of every family: channel-id, family-id, time locations and audio-quality index of every clip of every family. A lead combined-family member is selected. Again, the clip that has the longest duration is selected as the lead combined-family member.

Cross Channel Harvesting in the Same Market

Channels that are within the same market, e.g. all radio stations in the New York market, will be selected into the cross-channel harvesting exercise. First, determine what channel selection criteria are to be applied. Select channels based on the criteria into the harvesting process. Harvests identified on this level are referred to "Market-Level" harvests. The Instance-Table holds similarity information across channels in the same market.

TABLE 6

Instance Table in a Market-Level Harvesting Exercise. Each entry may contain similarity information of multiple clips.

| Channel | Channel | | | | |
|---|---|---|---|---|---|
| | Channel #1 | Channel #2 | Channel #3 | ... | Channel #M |
| Channel #1 | | similarity information across channels #1 and #2 | similarity information across channels #1 and #3 | ... | similarity information across channels #1 and #M |
| Channel #2 | | | similarity information across channels #2 and #3 | ... | similarity information across channels #2 and #M |

TABLE 6-continued

Instance Table in a Market-Level Harvesting Exercise. Each entry may contain similarity information of multiple clips.

| Channel | Channel | | | | |
|---|---|---|---|---|---|
| | Channel #1 | Channel #2 | Channel #3 | ... | Channel #M |
| Channel #3 | | | | ... | similarity information across channels #3 and #M |
| . | . | . | . | ... | . |
| . | . | . | . | | . |
| . | . | . | . | | . |
| Channel #M − 1 | | | | | similarity information across channels #M − 1 and #M |

Cross Channel Harvesting in Different Markets

Harvests from different markets obtained above are combined into the cross-channel harvesting exercise. Determine what market selection criteria are. One may have a presumption that certain market combination is likely to yield meaningful harvests. Harvests identified on this level is referred to "National-Level" harvests. The Instance-Table holds similarity information across channels of different markets.

TABLE 7

Instance Table in a National-Level Harvesting Exercise. Each entry may contain similarity information of multiple clips of two markets.

| Market | Market | | | | |
|---|---|---|---|---|---|
| | Market #1 | Market #2 | Market #3 | ... | Market #N |
| Market #1 | | similarity information across markets #1 and #2 | similarity information across markets #1 and #3 | ... | similarity information across markets #1 and #M |

TABLE 7-continued

Instance Table in a National-Level Harvesting Exercise. Each entry may contain similarity information of multiple clips of two markets.

| Market | Market #1 | Market #2 | Market #3 | ... | Market #N |
|---|---|---|---|---|---|
| Market #2 | | | similarity information across markets #2 and #3 | ... | similarity information across markets #2 and #M |
| Market #3 | | | | ... | similarity information across markets #3 and #M |
| . | . | . | . | ... | . |
| . | . | . | . | | . |
| . | . | . | . | | . |
| Market #N − 1 | | | | | similarity information across markets #N − 1 and #N |

Harvest Processing

The Harvester exercise yields similar programs on three levels:

Channel level: Similar programs of the same channel.
Market level: Similar programs of different channels in the same market.
National level: Similar programs of different channels of different markets.

Although here there may be substantial results or harvests of identifiable but unregistered content as determined on several levels, they are still remain as unknown programs until after human listening. The harvest processing stage consists of a number of steps: starting from the harvests collected on all the three levels, human listening, identification, to the end where certain clips out of the harvests are decided to be promoted to the monitoring system, that is, fully identified and registered in the monitoring system.

Human Listening—Identifying Harvests

The families of all the three levels will be presented to human operators for identification. The system will automatically select the clip that has the highest audio quality within the family and present to the human operator. The operator will identify the clip, and input the meta-data of the clip, including, for example, the song title, publisher, record label. If it is a song, the identification of the clip will be made by a format specialist, which generates the title and artist information.

Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting. It is appreciated that any of the software components of the present invention may, if desired, be implemented in ROM (read-only memory) form. The software components may, generally, be implemented in hardware, if desired, using conventional techniques.

The spirit and scope of the present invention are to be limited only by the terms of the appended claims.

What is claimed:

1. In a computer comprising a storage medium and an application running on said computer a method for detecting at least two substantially similar instances of the same piece of unregistered program in one or more program signals comprising:

determining using the computer whether two or more unregistered portions of said one or more program signals is sufficiently similar to each other by detecting one or more sufficiently matching features in the two or more unregistered portions; and determining whether the time positions associated with the corresponding one or more detected matching features in the two or more unregistered portions advance in sufficient synchrony to meet a pre-determined sequencing criteria; and storing in computer memory at least one data value representing the result of such test.

2. The method of claim 1 further comprising assigning an identification number to one of the unregistered portions.

3. The method of claim 1 further comprising determining whether the piece of unregistered program is substantially the same as a known piece of programming with indicia of identity associated with it and then changing an indicia of identity associated with the unregistered program to the indicia of identity associated with the known program.

4. The method of claim 3 further comprising converting an identification number assigned to the piece of unregistered program to an identification number corresponding to the known piece of programming.

5. The method of claim 1 where the detection step is further comprised of:

determining if the two or more unregistered portions overlap in time.

6. The method of claim 1 further comprising:

determining the relative audio quality of the two or more unregistered portions; and selecting the unregistered portion with the higher audio quality.

7. The method of claim 1 where the detection step is further comprised of: determining whether the time positions associated with the matching features in the two or more unregistered portions advance in sufficient synchrony.

8. The method of claim 1 where the detection step is further comprised of:

determining if the two or more unregistered portions overlap in time.

9. The method of claim 1 where the detection step is further comprised of: determining which of the matching unregistered portions is the longest in duration.

10. The method of claim 1 where the process detects self-similar portions of the signal in one pass through the signal data.

11. The method of claim 1 where the process is not adjusted for the type of signal content being processed.

12. The method of claim 1, where the sequencing criteria comprises:

calculating an error value associated with determining the sufficiently matching features;

selecting from possible matching unregistered portions the portion comprised of a matching feature with the lowest error value.

13. In a computer comprising a storage medium and an application running on said computer a method for detecting self-similar repetition in a program signal comprising:
  detecting using a computer processor a thread comprising a sequence of one or more portions of a first unregistered piece of programming, in one pass through the signal data, where each substantially consecutive portion of the first unregistered piece is determined to be sufficiently similar to a corresponding substantially consecutive portion of a second unregistered piece of unregistered programming by means of a sequencing test and storing in a computer memory at least one data value representing the result of said test, said sequencing test comprising first determining matching features in the two or more unregistered portions; and then determining whether the time positions associated with the matching features advance in sufficient synchrony to meet a pre-determined sequencing criteria.

14. The method of claim 13 further comprising:
  storing in computer memory as a single piece of programming the consecutive sequence of sufficiently similar portions where for each portion, the audio quality is determined to be better than the other corresponding sufficiently similar consecutive portion.

15. The method of claim 13, wherein the step of determining to be sufficiently self-similar comprises detecting sufficiently similar sets of pattern vectors associated with each of the substantially consecutive portions.

16. The method of claim 13 further comprising: assigning a unique identification number to one or more sets of pattern vectors that comprise the portions.

17. The method of claim 13 further comprising:
  determining an end of the thread by detecting one or more insufficiently similar portions of the first piece as compared to the corresponding portions of the second piece.

18. The method of claim 17, wherein the number of detections of insufficient similarity is a number greater than a predetermined threshold.

19. The method of claim 17 further comprising determining one of an approximate start time, approximate end time and approximate duration time corresponding to the thread.

20. The method of claim 13 where the first piece and the second piece do not substantially overlap.

21. The method of claim 13 further comprising:
  identifying a piece of unregistered programming in which sufficient similarities have been detected between a piece of registered programming and said piece of unregistered programming; and converting the status of said identified piece of unregistered programming from unregistered to registered.

22. The method of claim 13 further comprising determining whether the piece of unregistered program is substantially the same as a registered piece of programming and then changing an indicia of identity associated with the unregistered program to an indicia of identity associated with the registered program.

23. The method of claim 13 wherein each of said portions comprises one or more frames in duration.

24. The method of claim 13 where each of said portions is equal to or less than approximately 10 seconds.

25. The system of claim 14 wherein said sequencing test is further comprised of determining whether the time positions associated with the matching features advance in sufficient synchrony.

26. In a computer comprising a storage medium and an application running on said computer a method for detecting self-similar repetition in a program signal comprising:
  detecting by using a computer in a single pass through the signal data retrieved from computer memory insufficient self-similarities between two non-overlapping pieces of unregistered programming of a program signal by determining the number of pairs of insufficiently self-similar corresponding portions from each of the two pieces of unregistered programming, wherein said pairs of insufficiently self-similar corresponding portions substantially succeed a substantial number of detected substantially consecutive pairs of sufficiently self-similar corresponding portions, said consecutive pairs determined by detecting the self-similar portions by detecting sufficiently matching features in portions of the signal and determining whether the time indices corresponding to those detected matching features meet a sequencing criteria.

27. The method of claim 26 further comprising detecting insufficiently similar sets of pattern vectors associated with each of the two unregistered corresponding portions of the program signal.

28. The method of claim 26 further comprising assigning a unique identification number to one or more sets of pattern vectors that comprise each of the corresponding portions.

29. The method of claim 26 further comprising:
  accumulating a thread of portions determined to be sufficiently self-similar, wherein each accumulated portion is uniquely selected from each of said pairs of sufficient self-similar corresponding portions; and
  accumulating a thread of said selected portions, wherein the portions are ordered sequentially in time according to the relative order of the pair from which the portion was selected.

30. The method of claim 29 wherein the portion selected is selected for having at least relatively better audio quality.

31. The method of claim 26 further comprising determining one of an approximate start time, approximate end time and approximate duration time corresponding to the thread.

32. The method of claim 26 wherein said sufficient number comprises a number greater than a predetermined threshold.

33. The method of claim 26 further comprising:
  identifying a piece of unregistered programming in which sufficient similarities have been detected between a piece of registered programming and said piece of unregistered programming; and
  converting the status of said identified piece of unregistered programming from unregistered to registered.

34. The method of claim 26 further comprising determining whether the piece of unregistered program is substantially the same as a registered piece of programming and then changing an indicia of identity associated with the unregistered program to an indicia of identity associated with the registered program.

35. The method of claim 26 wherein each of said portions comprises one or more frames in duration.

36. A digital signal processing system for detecting at least two substantially similar instances of the same piece of unregistered program in one or more program signals comprising:
  a computer comprised of a computer processor; and a computer memory where the computer is adapted for detecting whether two or more unregistered portions of said one or more program signals is sufficiently self-similar by using a sequencing test on the at least two instances, said sequencing test comprising detecting sufficiently matching features in the two or more unregistered portions; and determining whether the time positions associated with the detected matching features advance in sufficient synchrony to meet a pre-determined sequencing criteria.

37. The system of claim 36 where the computer is further adapted for assigning an identification number to one or more of the unregistered portions.

38. The system of claim 36 where the computer is further adapted for determining whether the piece of unregistered program is substantially the same as a known piece of programming and then changing the indicia of identity associated with the unregistered program to the indicia of identity associated with the known program.

39. The system of claim 36 wherein said computer is further adapted for converting an identification number assigned to the piece of unregistered program to an identification number corresponding to the registered piece of programming.

40. The system of claim 36 where the computer is further adapted for determining if the two or more unregistered portions overlap in time.

41. The system of claim 36 where the computer is adapted so that it identifies when the two or more unregistered portions of one of said one or more program signals are substantially non-overlapping in time.

42. A digital signal processing system for detecting self-similar repetition in a program signal comprising:
   a computer comprising a computer processor; and a computer memory, where the computer is adapted for detecting in one pass through the signal data, a thread comprising a sequence of one or more portions of a first unregistered piece of programming, where each consecutive portion of the first unregistered piece is determined to be sufficiently similar to a corresponding substantially consecutive portion in a second unregistered piece of unregistered programming by means of a sequencing test, said sequencing test comprising detecting sufficiently matching features in the two or more unregistered portions; and comparing the time positions associated with the detected matching features to determine whether the time positions associated with the detected matching features advance in sufficient synchrony to meet a pre-determined sequencing criteria.

43. The system of claim 42 where the computer is further adapted for identifying a piece of unregistered programming in which sufficient similarities have been detected between a piece of registered programming and said piece of unregistered programming; and
converting the status of said identified piece of unregistered programming from unregistered to registered.

44. The system of claim 42 where the computer processor and computer memory are further adapted for determining whether the piece of unregistered program is substantially the same as a registered piece of programming and then changing an indicia of identity associated with the unregistered program to an indicia of identity associated with the registered program.

45. The system of claim 42 wherein said sequencing test is further comprised of determining whether the time positions associated with the matching features advance in sufficient synchrony.

46. In a computer, a method of detecting self similarity in a program signal by means of:
   for at least one pair of signal data samples in a plurality of signal data samples retrieved from computer memory signal, an at least one first sample of the pair from a first portion of the signal and an at least one second sample of the pair from a second portion of the signal, determining using a computer whether the at least one first samples have sufficiently the same value as the corresponding at least one second samples; and
   determining using a computer, whether the time values associated with the plurality of determined first samples increases in sufficient synchrony with the time values associated with the corresponding plurality of second samples.

47. The method of claim 46 further comprising:
   determining using a computer if the sufficiently same values are within a pre-determined error threshold.

48. A data storage device containing data that when executed as computer instructions executes the method of any of claims 1, 14, 7, 9, or 47.

49. A computer comprising a computer processor and a computer memory, where the computer is adapted by means of programming code stored in the computer memory to perform any of the processes claimed in claims .

50. A computer readable data storage medium comprising computer programming code that, when loaded into a computer and executed as a program, causes the computer to execute any of the processes claimed in claims 1, 2, 5, 6, 13-35, 7, 46, 12, 47.

* * * * *

UNITED STATES PATENT AND TRADEMARK OFFICE
CERTIFICATE OF CORRECTION

PATENT NO.        : 8,229,751 B2
APPLICATION NO.   : 11/322706
DATED             : July 24, 2012
INVENTOR(S)       : Kwan Cheung It is certified that error appears in the above-identified patent and that said Letters Patent is hereby corrected as shown below:

Title page, item [57] Abstract, Line 4: "be" should be changed to --been--
Column 1, Line 21: delete the words "the of" before the identified content ....
Column 1, Line 33: delete the words "yet and"
Column 2, Line 1: change "broadcast" to --broadcasts--
Column 2, Line 43: change "a" identifiable to "an" identifiable
Column 2, Line 51: change "to" to --two--
Column 3, Line 1: add --"-- after the word time
Column 3, Line 5: delete "to" before two other ways
Column 3, Line 48: add --,-- at the end of the word portion
Column 3, Line 62: change "describe" to --described--
Column 5, Line 21-22: change "refer this database" to --refer to this database--
Column 6, Line 6: delete the word "is"
Column 6, Line 34: change "a" to --an-- offset
Column 6, Line 64: Add a --.-- after the fourth word, which is threads
Column 7, Line 1: add the word --threads-- before the words are disqualified
Column 7, Line 24: add the word --to-- between the word threads and the phrase be at least
Column 12, Line 41: change the word "has" to --have--
Column 16, Line 13: add the word --and-- between advertisements,) and the word then
Column 16, Line 17: change the word "instants" to --instances--
Column 20, Line 51: change the word "is" to --are--
Column 21, Line 35: delete the word "are" before still remain...
Column 23, Claim 25, Line 61: correct the dependent designation from claim "14" to --13--
Column 26, Claim 48, Line 34: correct the claim numbers "14" to --13-- and "47" to --46--, and
re-arrange the numbers to read in chronological order as --1, 7, 9, 13, or 46--
Column 26, Claim 49, Line 38: please insert the claim numbers after the word claims, which were
improperly omitted during the printing process, but were entered into the record, the numbers should
read as --1-24, 26-35, 46 or 47--

Signed and Sealed this
Sixth Day of November, 2012

David J. Kappos
*Director of the United States Patent and Trademark Office*

Column 26, Claim 50, Lines 42-43: delete the incorrectly printed claim numbers "1, 2, 5, 6, 13-35, 7, 46, 12, 47" and enter the proper designations, which were entered into the record, as --1-24, 26-35, 46 or 47--